United States Patent
Zhang et al.

(10) Patent No.: US 10,915,435 B2
(45) Date of Patent: Feb. 9, 2021

(54) DEEP LEARNING BASED PROBLEM ADVISOR

(71) Applicant: INTERNATIONAL BUSINESS MACHINES CORPORATION, Armonk, NY (US)

(72) Inventors: Jian Zhang, Beijing (CN); Yi Bin Wang, Beijing (CN); Wu Weilin, Beijing (CN); Mu Dan Cao, Beijing (CN); Dan Tan, Chengdu (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/202,877

(22) Filed: Nov. 28, 2018

(65) Prior Publication Data

US 2020/0167271 A1    May 28, 2020

(51) Int. Cl.
| | |
|---|---|
| *G06F 9/44* | (2018.01) |
| *G06F 11/36* | (2006.01) |
| *G06F 8/41* | (2018.01) |
| *G06F 8/75* | (2018.01) |
| *G06N 5/02* | (2006.01) |

(52) U.S. Cl.
CPC .......... *G06F 11/3688* (2013.01); *G06F 8/433* (2013.01); *G06F 8/75* (2013.01); *G06F 11/3664* (2013.01); *G06N 5/022* (2013.01)

(58) Field of Classification Search
CPC ........ G06F 8/433; G06F 8/75; G06F 11/3664; G06F 11/3688; G06N 5/022
USPC .................................................. 717/124–135
See application file for complete search history.

(56) References Cited

U.S. PATENT DOCUMENTS

| | | | |
|---|---|---|---|
| 6,182,039 B1 * | 1/2001 | Rigazio | G10L 15/193 704/239 |
| 7,788,536 B1 | 8/2010 | Qureshi et al. | |
| (Continued) | | | |

FOREIGN PATENT DOCUMENTS

| | | |
|---|---|---|
| CN | 105653444 | 6/2016 |
| CN | 103970667 | 8/2016 |

OTHER PUBLICATIONS

Min Du et al., "DeepLog: Anomaly Detection and Diagnosis from System Logs through Deep Learning", 2017, ACM, pp. 1285-1298 (Year: 2017).*

(Continued)

*Primary Examiner* — Ted T. Vo
(74) *Attorney, Agent, or Firm* — Scott Dobson; Andrew D. Wright; Roberts Calderon Safran & Cole, P.C.

(57) ABSTRACT

Methods and systems for a deep learning based problem advisor are disclosed. A method includes: obtaining, by a computing device, a log file including events generated during execution of a software application; determining, by the computing device, at least one possible cause for a problem in the software application using the obtained log file and a knowledge base including calling paths for each of a plurality of methods in source code of the software application; for each of the at least one possible cause for the problem, the computing device simulating user actions in the software application; and determining, by the computing device, a root cause based on the simulating user actions in the software application.

20 Claims, 5 Drawing Sheets

(56) References Cited

U.S. PATENT DOCUMENTS

| | | | |
|---|---|---|---|
| 7,992,040 B2* | 8/2011 | Agarwal | G06F 11/079 714/26 |
| 8,776,026 B2* | 7/2014 | Candea | G06F 11/3612 717/126 |
| 9,069,668 B2* | 6/2015 | Tak | G06F 11/079 |
| 9,921,952 B2 | 3/2018 | Dean et al. | |
| 2011/0296386 A1 | 12/2011 | Woollen et al. | |
| 2012/0137367 A1* | 5/2012 | Dupont | G06F 21/00 726/25 |
| 2016/0357660 A1 | 12/2016 | Dean et al. | |
| 2017/0011308 A1 | 1/2017 | Sun et al. | |
| 2017/0212829 A1 | 7/2017 | Bales et al. | |
| 2017/0262360 A1 | 9/2017 | Kochura et al. | |
| 2018/0150742 A1 | 5/2018 | Woulfe et al. | |

OTHER PUBLICATIONS

Min Du et al., "DeepLog: Anomaly Detection and Diagnosis from System Logs through Deep Learning", 2017, presenting slides, University of Utah, 107 pages (Year: 2017).*
Feng et al., "Anomaly Detection Using Call Stack Information", 2003, IEEE. 14 pages (Year: 2003).*
Anamika et al., "Log Aggregator for Better Root-Cause-Analysis", 2015, International Journal of Computer Science and Information Technologies, vol. 6 (2), pp. 1100-1102 (Year: 2015).*
Bales, Abstract of "Deep Learning Program Analysis: A New Paradigm for Analyzing Computer Programs", 2016, 3 pages.
Anonymous, Abstract of "Method and Apparatus for Cognitive Test Advisor in Application DevOps", Nov. 10, 2016, 1 pages.

* cited by examiner

DEEP LEARNING BASED PROBLEM ADVISOR

BACKGROUND

The present invention generally relates to computing devices and, more particularly, to methods and systems for a deep learning based problem advisor.

Software applications are typically updated to add new features and fix problems (e.g., bugs) in response to feedback received from users. Automated testing is typically performed on software applications to generate reports that assist in identifying and fixing bugs.

SUMMARY

In a first aspect of the invention, there is a method that includes: obtaining, by a computing device, a log file including events generated during execution of a software application; determining, by the computing device, at least one possible cause for a problem in the software application using the obtained log file and a knowledge base including calling paths for each of a plurality of methods in source code of the software application; for each of the at least one possible cause for the problem, the computing device simulating user actions in the software application; and determining, by the computing device, a root cause based on the simulating user actions in the software application.

In another aspect of the invention, there is a computer program product that includes a computer readable storage medium having program instructions embodied therewith. The program instructions are executable by a computing device to cause the computing device to: create a directed graph including calling paths for each of a plurality of methods in source code of a software application; obtain a log file including events generated during execution of the software application; generate calling path ratings by performing static analysis on each of the calling paths for each of the plurality of methods in the source code of the software application; and generate a knowledge base using the calling paths for each of the plurality of methods in the source code of the software application and the calling path ratings.

In another aspect of the invention, there is a system that includes: a hardware processor, a computer readable memory, and a computer readable storage medium associated with a computing device; program instructions to obtain a log file including events generated during execution of a software application; program instructions to determine at least one possible cause for a problem in the software application using the obtained log file and a knowledge base including calling paths for each of a plurality of methods in source code of the software application; program instructions to, for each of the at least one possible cause for the problem, simulate user actions in the software application; and program instructions to determine a root cause from each of the at least one possible cause based on the simulating user actions in the software application, wherein the program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to computing devices and, more particularly, to methods and systems for a deep learning based problem advisor. As described herein, aspects of the invention include a method and system for training a knowledge base and using the knowledge base to automatically determine a root cause for a problem in a software application.

Conventional automated software testing is problematic because software developers spend significant amounts of time analyzing reports generated by the automated software testing in order to determine a root cause for a software problem (or defect) and to repair the software problem. Additionally, software developers and support teams spend significant amounts of time determining a root cause for a software problem in response to receiving a description of the software problem and application logs from a customer. Additionally, some software problems that occur in a production environment are difficult to reproduce in a development environment or a testing environment.

Aspects of the present invention address these problems associated with conventional automated software testing and customer support and improve the functioning of a computer by providing methods and systems for training a knowledge base and using the knowledge base to automatically determine a root cause for a problem in a software application. Additionally, embodiments improve software by providing methods and systems for automatically providing a precise path to the problem in the software application as well as log information related to the problem. Furthermore, embodiments improve software by providing methods and systems for automatically correcting the problem in the source code using knowledge stored in a knowledge base, verifying the correction by re-running the problem path in the software application, and in response to the correcting being verified, recommending the verified correction to developers of the software application. Accordingly, through the use of rules that improve computer-related technology, implementations of the invention allow computer performance of functions not previously performable by a computer. Additionally, implementations of the invention use techniques that are, by definition, rooted in computer technology (e.g., machine learning and deep learning).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
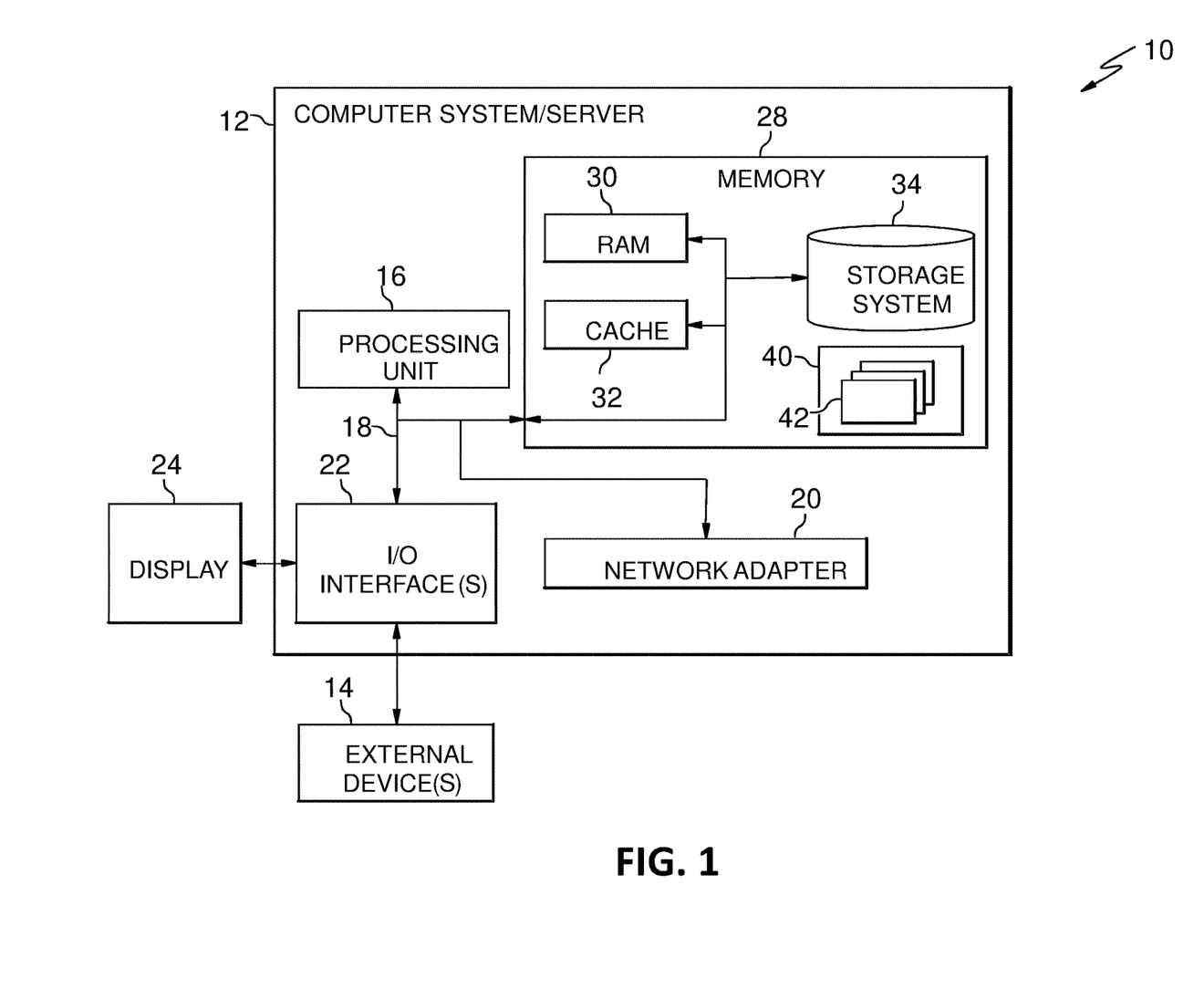
FIG. 1 depicts a computer system in accordance with aspects of the invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
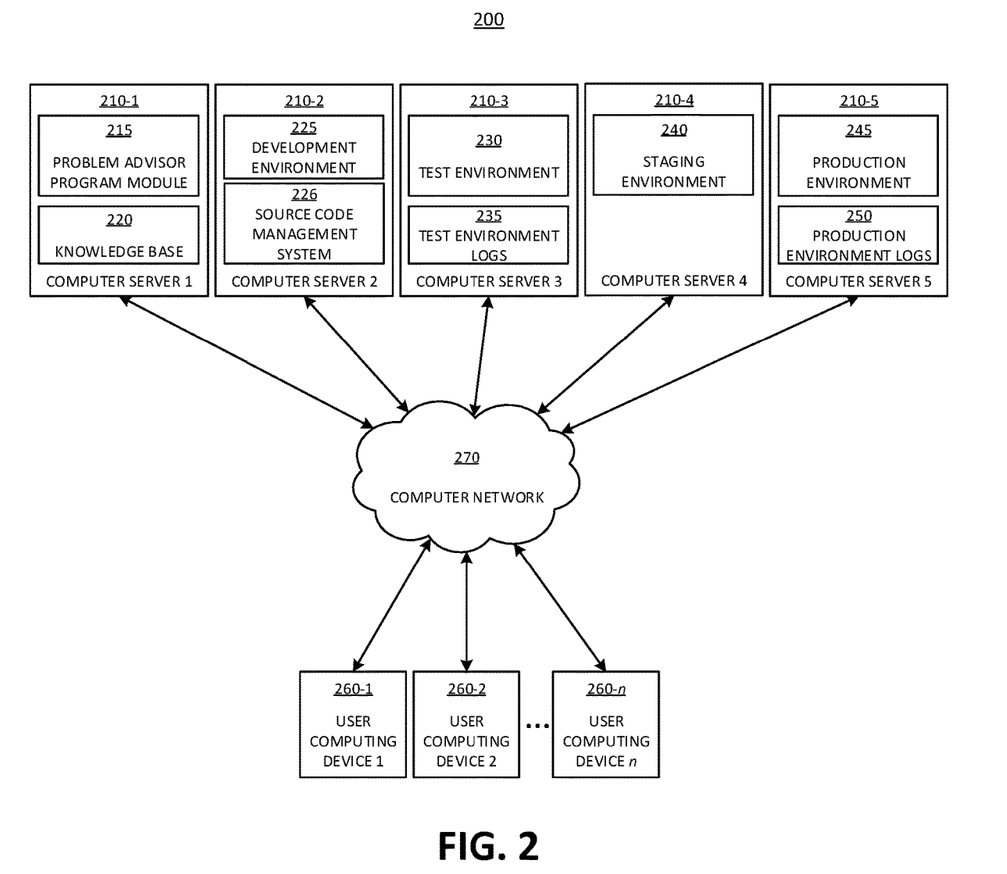
FIG. 2 depicts an illustrative environment in accordance with aspects of the invention.

FIG. 2 depicts an illustrative environment 200 in accordance with aspects of the invention. As shown, the environment 200 comprises a plurality of computer servers 210-1, 210-2, 210-3, 210-4, 210-5 and a plurality of user computing devices 260-1, 260-2, . . . , 260-n which are in communication via a computer network 270. In embodiments, the computer network 270 is any suitable network including any combination of a LAN, WAN, or the Internet. In embodiments, the plurality of computer servers 210-1, 210-2, 210-3, 210-4, 210-5 and the plurality of user computing devices 260-1, 260-2, . . . , 260-n are physically collocated, or, more typically, are situated in separate physical locations.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200.

In embodiments, each of the computer servers 210-1, 210-2, 210-3, 210-4, 210-5 is a computer device comprising one or more elements of the computer system/server 12 (as shown in FIG. 1). In particular, each of the computer servers 210-1, 210-2, 210-3, 210-4, 210-5 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the computer server 210-1 includes a problem advisor program module 215, which includes hardware and/or software such as one or more of the program modules 42 shown in FIG. 1. The problem advisor program module 215 includes program instructions for a deep learning based problem advisor that trains a knowledge base 220 and uses the knowledge base 220 to automatically determine a root cause for a problem in a software application. In embodiments, the program instructions included in the problem advisor program module 215 of the computer server 210-1 are executed by one or more hardware processors.

In embodiments, the computer server 210-1 also includes the knowledge base 220, which is generated/updated by the problem advisor program module 215 and includes knowledge used by the problem advisor program module 215 to automatically determine root causes for and automatically fix problems in software applications. The knowledge base 220 is implemented using hardware and/or software such as an electronic storage device, a magnetic storage device, an optical storage device, an electromagnetic storage device, a semiconductor storage device, or any suitable combination of the foregoing. In other embodiments, the knowledge base 220 is implemented using a network storage server, a cloud storage server, a Storage Area Network (SAN), or Network Attached Storage (NAS).

Still referring to FIG. 2, in embodiments, the computer server 210-2 includes or provides connectivity to a development environment 225 and a source code management system 226, which are implemented using hardware and/or software using components such as one or more of the program modules 42 shown in FIG. 1, mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients. The development environment 225 is used for development of a software application. The source code management system 226 is a version control system (e.g., Git) that stores source code for a software application and tracks changes in the source code during the development of the software application. In embodiments, users of the user computing devices 260-1, 260-2, . . . , 260-n interact with the development environment 225 and the source code management system 226, via the computer server 210-2, to develop the software application.

Still referring to FIG. 2, in embodiments, the computer server 210-3 includes or provides connectivity to a test environment 230, which is implemented using hardware and/or software using components such as one or more of the program modules 42 shown in FIG. 1, mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients. The test environment 230 is used for testing of the software application that was developed using the development environment 225. In embodiments, users of the user computing devices 260-1, 260-2, . . . , 260-n interact with the test environment 230, via the computer server 210-2, to test the software application. In embodiments, the computer server 210-3 also includes or provides connectivity to test environment logs 235, which are generated and log events during testing of the software application.

Still referring to FIG. 2, in embodiments, the computer server 210-4 includes or provides connectivity to a staging environment 240, which is implemented using hardware and/or software using components such as one or more of the program modules 42 shown in FIG. 1, mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients. The staging environment 240 is used for staging of the software application that was developed using the development environment 225 and tested using the testing environment 230. In embodiments, users of the user computing devices 260-1, 260-2, . . . , 260-n interact with the staging environment 240, via the computer server 210-4, to stage the software application.

Still referring to FIG. 2, in embodiments, the computer server 210-5 includes or provides connectivity to a production environment 245, which is implemented using hardware and/or software using components such as one or more of the program modules 42 shown in FIG. 1, mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients. The production environment 245 is used to host and run the software application that was developed using the development environment 225, tested using the testing environment 230, and staged using the staging environment 240, while it is in production (i.e., in use by end users). In embodiments, users of the user computing devices 260-1, 260-2, . . . , 260-n interact with the staging environment 240 and/or the production environment 245, via the computer server 210-4 and/or the computer server 210-5, to move the software application from the staging environment 240 to the production environment 245. In embodiments, the computer server 210-5 also includes or provides connectivity to production environment logs 250, which are generated and log events while the software application runs in the production environment 245.

Still referring to FIG. 2, in embodiments, each of the user computing devices 260-1, 260-2, . . . , 260-n is a computer device comprising one or more elements of the computer system/server 12 (as shown in FIG. 1). In embodiments, each of the user computing devices 260-1, 260-2, . . . , 260-n is a desktop computer, a laptop computer, a mobile device such as a cellular phone, tablet, personal digital assistant (PDA), or other computing device.

Figure 3:
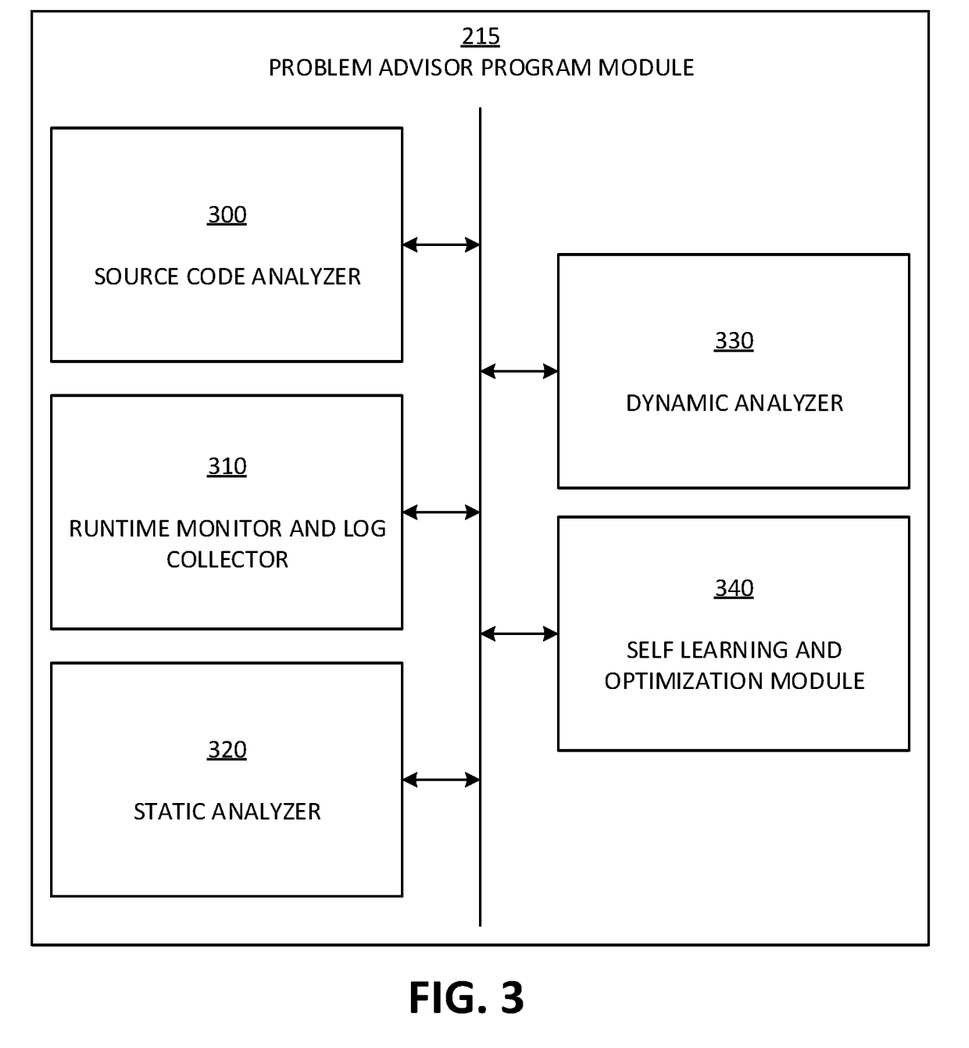
FIG. 3 depicts a block diagram of an exemplary program module in accordance with aspects of the invention.

FIG. 3 depicts a block diagram of an exemplary problem advisor program module 215 in the computer server 210-1 (of FIG. 2) in accordance with aspects of the invention. In embodiments, the problem advisor program module 215 includes a source code analyzer 300, a runtime monitor and log collector 310, a static analyzer 320, a dynamic analyzer 330, and a self-learning and optimization module 340, each of which may comprise one or more program modules 42 as described with respect to FIG. 1. In embodiments, the problem advisor program module 215 may include additional or fewer components than those shown in FIG. 3. In embodiments, separate components may be integrated into a single computing component or module. Additionally, or alternatively, a single component may be implemented as multiple computing components or modules.

In embodiments, the source code analyzer 300 parses and analyzes versioned source code to create directed graphs of all possible method calling paths. In particular, the source code analyzer 300 obtains versioned source code of the software application from the source code management system 226 on the computer server 210-2 or from the test environment 230 on the computer server 210-3. In other embodiments, the source code analyzer 300 obtains versioned source code from the development environment 225. The source code analyzer 300 then analyzes the obtained source code to create a directed graph of all possible calling paths (with metadata) for all of the methods in the obtained source code, such as "v1.0: MethodA(log, exception, parameters)→MethodB(log, exception, parameters)→MethodC (log, exception, parameters)." The source code analyzer 300 stores the directed graph in the knowledge base 220 on the computer server 210-1.

Still referring to FIG. 3, in embodiments, the runtime monitor and log collector 310 gathers and sorts all logs for a particular version of the source code. In particular, the runtime monitor and log collector 310 obtains, aggregates, and sorts the test environment logs 235 from the computer server 210-3 and the production environment logs 250 from the computer server 210-5 that correspond to the version of the source code analyzed by the source code analyzer 300. In embodiments, the runtime monitor and log collector 310 sorts the test environment logs 235 and the production environment logs 250 based on a log focus (e.g., null pointer error, database lock, etc.) specified by a user of one of the user computing devices 260-1, 260-2, . . . , 260-n. Additionally, in embodiments, the runtime monitor and log collector 310 obtains a runtime stack of the staging environment 240 on the computer server 210-4 and a runtime stack of the production environment 245 of the computer server 210-5, which are used by the dynamic analyzer 330 as described below.

In embodiments, the test environment logs 235 obtained by the runtime monitor and log collector 310 are created and log events during testing of the software application in the test environment 230 on the computer server 210-3. The production environment logs 250 obtained by the runtime monitor and log collector 310 are created and log events while the software application runs and is used by end users in the production environment 245 on the computer server 210-5.

Still referring to FIG. 3, in embodiments, the static analyzer 320 statically scans related source codes of the development environment 225 on the computer server 210-2 and the test environment 230 on the computer server 210-3. In particular, static analyzer 320 obtains the source code from the source code analyzer 300 and performs static analysis on the source code using the knowledge base 220 on the computer server 210-1 and the test environment logs 235 and the production environment logs 250 aggregated by the runtime monitor and log collector 310.

In embodiments, the static analyzer 320 performs static analysis of the source code and rates calling paths based on static rules, similarity analysis, correlation analysis, and dependency analysis. In performing the static analysis of the source code based on static rules, the static analyzer 320 analyzes all possible ways methods can call other methods using the directed graph stored in the knowledge base 220 by the source code analyzer 300. In performing the similarity analysis, the static analyzer 320 predicts problems in calling paths based on problems that exist in similar calling paths, based on information in the test environment logs 235 and the production environment logs 250 obtained by the runtime monitor and log collector 310. In performing the correlation analysis, the static analyzer 320 correlates problems occurring in certain calling paths with problems occurring in other calling paths, based on information in the test environment logs 235 and the production environment logs 250 obtained by the runtime monitor and log collector 310. In performing the dependency analysis, the static analyzer 320 identifies calling paths that encounter problems only when they follow other calling paths, based on information in the test environment logs 235 and the production environment logs 250 obtained by the runtime monitor and log collector 310.

Still referring to FIG. 3, in embodiments, the dynamic analyzer 330 works with the runtime monitor and log collector 310 and the static analyzer 320 to dynamically analyze the runtime attributes of the software application using the knowledge base 220. In particular, the dynamic analyzer 330 analyzes the runtime stack of the staging environment 240 and the runtime stack of the production environment 245 obtained by the runtime monitor and log collector 310 to identify the different running paths of the software application. The dynamic analyzer 330 also verifies the static analysis result from the static analyzer 320 by simulating corresponding user actions with respect to the software application on different environments. Accordingly, the dynamic analyzer 330 rules out noise data in the test environment logs 235 and the production environment logs 250 as well as in the environment configuration (as provided by the runtime monitor and log collector 310) and adjusts the calling path ratings (metrics) generated by the static analyzer 320 based on a simulated result. The dynamic analyzer 330 provides a running path and an analysis result (e.g., the adjusted calling path ratings) to the self learning and optimization module 340.

Still referring to FIG. 3, in embodiments, the self learning and optimization module 340 receives inputs from the static analyzer 320 and the dynamic analyzer 330 and classifies, defines time series data, simulates, verifies, refines, and optimizes related inputs based on specific requests. The self learning and optimization module 340 trains the knowledge base 220 using deep learning techniques based on the inputs received from the static analyzer 320 and the dynamic analyzer 330. The self learning and optimization module 340 also saves source code fixes and other optimizations into the knowledge base 220. These source code fixes and other optimizations saved in the knowledge base 220 are used by the static analyzer 320 and the dynamic analyzer 330, as described below.

Figure 4:
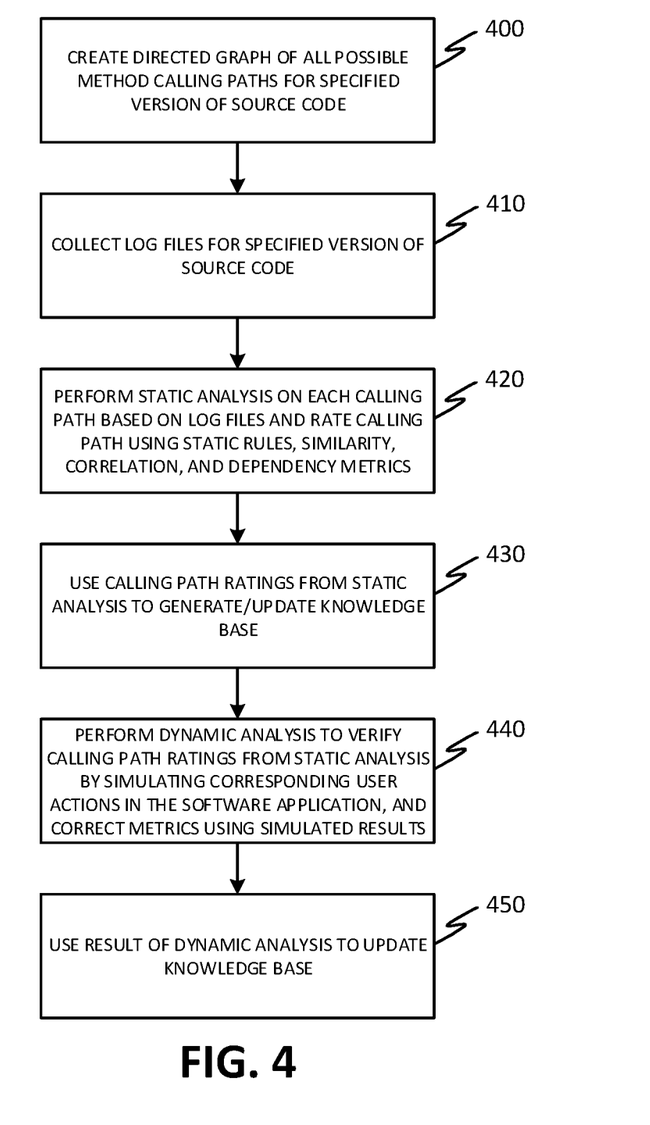
FIGS. 4 and 5 depict flowcharts of exemplary methods performed in accordance with aspects of the invention.

FIG. 4 depicts a flowchart of an exemplary training method performed by the problem advisor program module 215 of the computer server 210-1 in accordance with aspects of the invention. The steps of the method are performed in the environment of FIG. 2 and are described with reference to the elements shown in FIGS. 2 and 3.

At step 400, the computer server 210-1 creates a directed graph of all possible method calling paths for a specified version of the source code. In embodiments, as described with respect to FIG. 3, step 400 comprises the source code analyzer 300 of the problem advisor program module 215 obtaining versioned source code from the source code management system 226 on the computer server 210-2 or from the test environment 230 on the computer server 210-3. The source code analyzer 300 then analyzes the obtained source code to create a directed graph of all possible method calling paths in the obtained source code with metadata, such as "v1.0: MethodA(log, exception, parameters) →MethodB(log, exception, parameters)→MethodC(log, exception, parameters)." The directed graph is stored in the knowledge base 220 on the computer server 210-1.

At step 410, the computer server 210-1 collects log files for the specified version of the source code. In embodiments, as described with respect to FIG. 3, step 410 comprises the runtime monitor and log collector 310 of the problem advisor program module 215 obtaining, aggregating, and sorting the test environment logs 235 from the computer server 210-3 and the production environment logs 250 from the computer server 210-5. In embodiments, the runtime monitor and log collector 310 sorts the test environment logs 235 and the production environment logs 250 based on a log focus (e.g., null pointer error, database lock, etc.) specified by a user of one of the user computing devices 260-1, 260-2, . . . , 260-n.

At step 420, the computer server 210-1 preforms static analysis on each calling path based on log files and rates each calling path using static rules, similarity, correlation, and dependency metrics. In embodiments, as described with respect to FIG. 3, step 420 comprises the static analyzer 320 of the problem advisor program module 215 using the source code obtained by the source code analyzer 300 at step 400 and performing static analysis on each calling path in the source code (determined at step 400) using the knowledge base 220 on the computer server 210-1 and the test environment logs 235 and the production environment logs 250 aggregated by the runtime monitor and log collector 310. In embodiments, the static analyzer 320 performs static analysis of the source code and rates each calling path based on static rules, similarity analysis, correlation analysis, and dependency analysis.

At step 430, the computer server 210-1 uses the calling path ratings from the static analysis to generate/update the knowledge base 220. In embodiments, as described with respect to FIG. 3, step 430 comprises the self learning and optimization module 340 of the problem advisor program module 215 generating or updating the knowledge base 220 using deep learning techniques and the calling path ratings generated by the static analyzer 320 at step 420. In particular, the self learning and optimization module 340 uses deep learning techniques to update existing data stored in the knowledge base 220 based on a comparison with the analysis results (e.g., calling path ratings) generated by the static analyzer 320 at step 420. The self learning and optimization module 340, in updating the knowledge base 220, takes into account updated calling paths in new versions of the source code as well as information stored in the test environment logs 235 and the production environment logs 250 (e.g., user actions for updated versions of the environment logs 235 and the production environment logs 250 may be different, and the new version of the source code may have new calling paths and metadata).

At step 440, the computer server 210-1 performs dynamic analysis to verify the calling path ratings from the static analysis by simulating corresponding user actions in the software application, and corrects the metrics using simulated results. In embodiments, as described with respect to FIG. 3, step 440 comprises the dynamic analyzer 330 of the problem advisor program module 215 verifying results of the static analysis performed by the static analyzer 320 at step 420 by simulating corresponding user actions in the software application on different environments. Accordingly, the dynamic analyzer 330 rules out noise data in the test environment logs 235 and the production environment logs 250 as well as in the environment configuration (as provided by the runtime monitor and log collector 310) and corrects (adjusts) the calling path ratings (metrics) based on a simulated result.

At step 450, the computer server 210-1 uses the results of the dynamic analysis to update the knowledge base 220. In embodiments, as described with respect to FIG. 3, step 450 comprises the self learning and optimization module 340 of the problem advisor program module 215 updating the knowledge base 220 using deep learning techniques and the corrected calling path ratings generated by the dynamic analyzer 330 at step 440.

Figure 5:
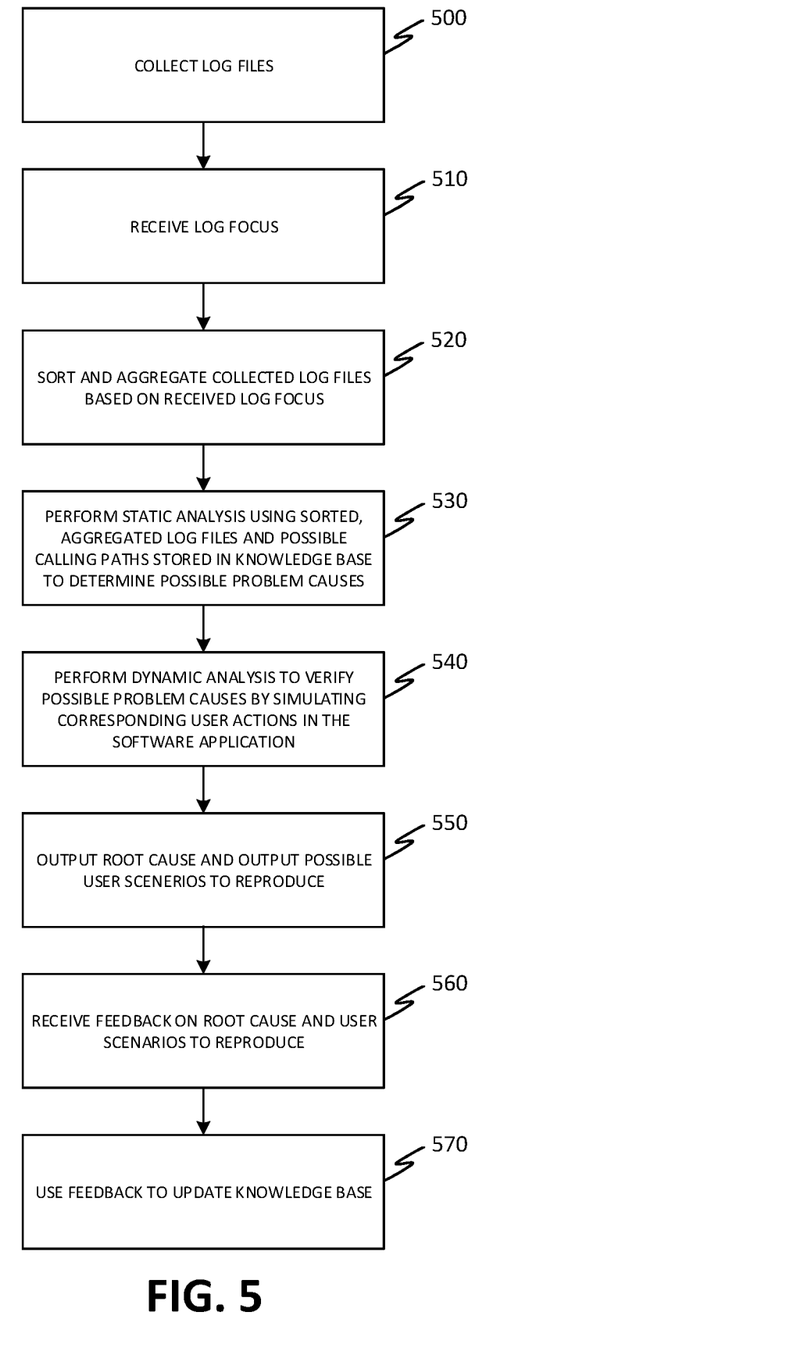

FIG. 5 depicts a flowchart of an exemplary method for using and refining the knowledge base 220 (after training the knowledge base 220 according to the method of FIG. 4) performed by the problem advisor program module 215 of the computer server 210-1 in accordance with aspects of the invention. The steps of the method are performed in the environment of FIG. 2 and are described with reference to the elements shown in FIGS. 2 and 3.

At step 500, the computer server 210-1 collects log files. In embodiments, as described with respect to FIG. 3, step 500 comprises the runtime monitor and log collector 310 of the problem advisor program module 215 obtaining the test environment logs 235 from the computer server 210-3 and/or the production environment logs 250 from the computer server 210-5, in response to a request from a user of one of the user computing devices 260-1, 260-2, . . . , 260-n to determine a cause of a software problem in a software application.

At step 510, the computer server 210-1 receives a log focus. In embodiments, as described with respect to FIG. 3, step 510 comprises the runtime monitor and log collector 310 of the problem advisor program module 215 receiving a log focus (e.g., null pointer error, database lock, etc.) related to the software problem from a user of one of the user computing devices 260-1, 260-2, . . . , 260-n.

At step 520, the computer server 210-1 sorts and aggregates the collected log files based on the received log focus. In embodiments, as described with respect to FIG. 3, step 510 comprises the runtime monitor and log collector 310 of the problem advisor program module 215 aggregating and sorting the test environment logs 235 and/or the production environment logs 250 based on the received log focus.

At step 530, the computer server 210-1 performs static analysis using the sorted, aggregated log files and possible calling paths stored in the knowledge base 220 to determine possible problem causes. In embodiments, as described with respect to FIG. 3, step 530 comprises the static analyzer 320 of the problem advisor program module 215 using deep learning techniques to compare the test environment logs 235 and/or the production environment logs 250 sorted and aggregated by the runtime monitor and log collector 310 at step 520 with possible calling paths stored in the knowledge base 220 to determine possible causes for the problem in the software application.

At step 540, the computer server 210-1 performs dynamic analysis to verify the possible problem causes by simulating corresponding user actions in the software application. In embodiments, as described with respect to FIG. 3, step 540 comprises the dynamic analyzer 330 of the problem advisor program module 215 verifying the possible problem causes determined by the static analyzer 320 at step 530 by simulating corresponding user actions in the software application on different environments.

At step 550, the computer server 210-1 outputs a root cause and outputs possible user scenarios to reproduce. In embodiments, as described with respect to FIG. 3, step 550 comprises the dynamic analyzer 330 of the problem advisor program module 215 outputting a running path with a source code calling stack to a software developer (e.g., a user of one the of user computing devices 260-1, 260-2, . . . , 260-n). The running path and the source code calling stack output by the dynamic analyzer 330 directly identify the root cause of the software problem. Additionally, step 550 comprises the dynamic analyzer 330 outputting possible user scenarios for reproducing the software problem. A software developer may be able to quickly correct the software problem using the root cause that is output at step 550. Additionally, a user may be able to avoid the problem based on the possible user scenarios for reproducing the software problem that are output at step 550.

In other embodiments, at step 550, the dynamic analyzer 330 automatically updates the source code using a verified fix for the software problem included in the knowledge base 220. In other embodiments, at step 550, the dynamic analyzer 330 recommends a verified fix included in the knowledge base 220 to developers of the software application.

At step 560, the computer server 210-1 receives feedback on the root cause and the user scenarios to reproduce. In embodiments, as described with respect to FIG. 3, step 560 comprises the self learning and optimization module 340 of the problem advisor program module 215 receiving feedback from a software developer (e.g., using one of the user computing devices 260-1, 260-2, . . . , 260-n) regarding whether or not the root cause output by the dynamic analyzer 330 at step 550 is correct and receiving feedback from a user (e.g., using one of the user computing devices 260-1, 260-2, . . . , 260-n) regarding whether or not the possible user scenarios for reproducing the software problem are correct. In other embodiments, step 560 also comprises the self learning and optimization module 340 receiving feedback from the software developer regarding a fix (e.g., updated source code) for the software problem.

At step 570, the computer server 210-1 uses the feedback to update the knowledge base 220. In embodiments, as described with respect to FIG. 3, step 570 comprises the self learning and optimization module 340 of the problem advisor program module 215 using the feedback received at step 560 to update the knowledge base 220 using deep learning techniques, enabling the problem advisor program module 215 to self-learn and improve its accuracy in identifying root causes of software problems. In other embodiments, step 570 also comprises the self learning and optimization module 340 using the fix received at step 560 to update the knowledge base 220 using deep learning techniques, enabling the problem advisor program module 215 to self-learn and improve its capabilities for providing automated fixes for software problems. Additionally, in embodiments, step 570 comprises the self learning and optimization module 340 verifying the fix received at step 560 by re-running the problem path in the software application, and in response to the fix being verified, updating the knowledge base 220.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    obtaining, by a computing device, a log file including events generated during execution of a software application;
    determining, by the computing device, at least one possible cause for a problem in the software application using the obtained log file and a knowledge base including calling paths for each of a plurality of methods in source code of the software application;
    for each of the at least one possible cause for the problem, the computing device simulating user actions in the software application on different environments;
    determining, by the computing device, a root cause based on the simulating user actions in the software application; and
    in response to determining the root cause, the computing device automatically updating the source code of the software application using a verified source code fix for the problem,
    wherein the verified source code fix is included in the knowledge base and comprises updated source code.

2. The method according to claim 1, wherein the root cause is one of the at least one possible cause and comprises a running path with a source code calling stack.

3. The method according to claim 1, further comprising determining, by the computing device, a user scenario to reproduce the problem in the software application.

4. The method according to claim 3, further comprising:
    outputting, by the computing device, the root cause and the user scenario to reproduce the problem in the software application; and
    receiving, by the computing device, feedback from a user on the root cause and the user scenario to reproduce the problem in the software application.

5. The method according to claim 4, further comprising updating, by the computing device, the knowledge base using the received feedback from the user.

6. The method according to claim 1, further comprising:
    receiving, by the computing device from a user, a log focus; and
    sorting, by the computing device, the obtained log file based on the log focus.

7. The method according to claim 1, wherein the determining the at least one possible cause for the problem in the software application comprises performing static analysis on the obtained log file.

8. The method according to claim 1, wherein dynamic analysis is performed in the simulating user actions in the software application.

9. The method according to claim 1, further comprising:
    receiving, by the computing device, feedback comprising the updated source code; and determining, by the computing device, that the updated source code is the verified source code fix by re-running a problem path in the software application.

10. A computer program product comprising a computer readable storage medium having program instructions embodied therewith, the program instructions executable by a computing device to cause the computing device to:

create a directed graph including calling paths for each of a plurality of methods in source code of a software application;

obtain a log file including events generated during execution of the software application;

generate calling path ratings by performing static analysis on each of the calling paths for each of the plurality of methods in the source code of the software application;

generate a knowledge base using the calling paths for each of the plurality of methods in the source code of the software application and the calling path ratings, obtain an updated log file;

determine a root cause for a problem in the software application using the updated log file and the knowledge base; and in response to determining the root cause, automatically update the source code of the software application using a verified source code fix for the problem, wherein the verified source code fix is included in the knowledge base and comprises updated source code.

11. The computer program product according to claim 10, the program instructions further being executable by the computing device to cause the computing device to:

adjust the calling path ratings by performing dynamic analysis including simulating user actions in the software application; and update the knowledge base using the adjusted calling path ratings.

12. The computer program product according to claim 10, the program instructions further being executable by the computing device to cause the computing device to:

for each of at least one possible cause for the problem, simulate user actions in the software application; and determine the root cause from each of the at least one possible cause based on the simulated user actions in the software application.

13. The computer program product according to claim 12, wherein the root cause is one of the at least one possible cause and comprises a running path with a source code calling stack.

14. The computer program product according to claim 12, the program instructions further being executable by the computing device to cause the computing device to determine a user scenario to reproduce the problem in the software application.

15. The computer program product according to claim 14, the program instructions further being executable by the computing device to cause the computing device to:

output the root cause and the user scenario to reproduce the problem in the software application; and receive feedback from a user on the root cause and the user scenario to reproduce the problem in the software application.

16. The computer program product according to claim 15, the program instructions further being executable by the computing device to cause the computing device to update the knowledge base using the received feedback from the user.

17. A system comprising:

a hardware processor, a computer readable memory, and a computer readable storage medium associated with a computing device;

program instructions to obtain a log file including events generated during execution of a software application;

program instructions to determine at least one possible cause for a problem in the software application using the obtained log file and a knowledge base including calling paths for each of a plurality of methods in source code of the software application;

program instructions to, for each of the at least one possible cause for the problem, simulate user actions in the software application on different environments;

program instructions to determine a root cause from each of the at least one possible cause based on the simulating user actions in the software application; and in response to determining the root cause, automatically update the source code of the software application using a verified source code fix for the problem, wherein:

the verified source code fix is included in the knowledge base and comprises updated source code, and the program instructions are stored on the computer readable storage medium for execution by the hardware processor via the computer readable memory.

18. The system according to claim 17, wherein the root cause is one of the at least one possible cause and comprises a running path with a source code calling stack.

19. The system according to claim 17, further comprising program instructions to determine a user scenario to reproduce the problem in the software application.

20. The system according to claim 19, further comprising:

program instructions to output the root cause and the user scenario to reproduce the problem in the software application;

program instructions to receive feedback from a user on the root cause and the user scenario to reproduce the problem in the software application; and program instructions to update the knowledge base using the received feedback from the user.

* * * * *